(12) United States Patent
Jablonski et al.

(10) Patent No.: US 6,278,521 B1
(45) Date of Patent: *Aug. 21, 2001

(54) METHOD OF AND APPARATUS FOR BISPECTRAL FLUORESCENCE COLORIMETRY

(75) Inventors: Joseph Jablonski, Wilmot; James Leland, Goshen; Richard Montminy, Hookset; Kevin Carr, Sunapee; Arthur Springsteen, New London; David Griffiths, South Sutton; Angelo Arecchi, Hebron, all of NH (US)

(73) Assignee: Labsphere, Inc., North Sutton, NH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/201,036

(22) Filed: Nov. 30, 1998

(51) Int. Cl.$^7$ ........................................... G01J 3/51
(52) U.S. Cl. ..................... 356/402; 356/417; 356/318
(58) Field of Search .................................. 356/317, 417, 356/318, 326, 328, 402–411, 330–334; 250/458.1, 459.1, 461.1, 461.2

(56) References Cited

U.S. PATENT DOCUMENTS 3,216,313 * 11/1965 Chisholm .
4,681,444 * 7/1987 Ferber et al. .

OTHER PUBLICATIONS

McGeorge; "Imaging Systems: Detectors of the Past, Present and Future;" Spectroscopy vol. 2 No. 4 1987 pp. 1–6.*

Zwinkels et al; "Design . . . Measurements" Applied Optics, vol. 36, No. 4 Feb. 1, 1997.*

* cited by examiner

*Primary Examiner*—F. L Evans
(74) *Attorney, Agent, or Firm*—Rines and Rines

(57) ABSTRACT

A novel modular bench-top bispectral fluorescence colorimeter and technique embodying in self-contained housing excitation and emission monochromator, preferably with fiber light guide interconnections, and processing for accurately determining the bispectral radiance factors defining the true color of fluorescent materials and the like, and enabling a variety of data presentation formats descriptive thereof.

10 Claims, 7 Drawing Sheets

METHOD OF AND APPARATUS FOR BISPECTRAL FLUORESCENCE COLORIMETRY

The present invention relates to colorimetry and to high precision spectrophotometry, being more particularly concerned with the use of such colorimetry to provide absolute measurements and quantification of the color appearance of fluorescent materials and the like that can enable a complete and illuminant-independent colorimetric characterization of the materials, and with a self-contained benchtop instrument.

BACKGROUND OF INVENTION

Conventional colorimeters measure the light reflected from a sample in several discrete wavebands in the visible range of the spectrum. For example, for 10 nanometer (nm) wide bands, there may be 41 discrete data points recorded from 380 to 780 nm. Each of these data points represents the reflectance of the sample for light in that band. These 41 data points are then processed to generate a numerical description of the chromaticity when viewed under a user-defined illuminant.

When fluorescent materials are illuminated with light of one waveband, however, light is reflected not only in that band, but light may also be emitted at different wavelengths, resulting from the ability of fluorescent materials to absorb light at one wavelength and emit fluorescent light at different, usually longer wavelengths. To measure the color of a fluorescent sample, therefore, many more data points are required, such as, for example, an additional 1148 data points for the same 10 nm bandwidth. These 1148 data points represent the light emitted in one band due to light absorbed in another (shorter wavelength) band. The excitation range, moreover, must be extended down to the lowest wavelength of expected illumination, generally 300 nm. These 1189 "bispectral" data points are then processed to generate a numerical description of the chromaticity as viewed under the user-defined illuminant, as shown in later-described FIG. 1—a grid showing the above-described 41 reflectance data points and the 1148 fluorescence or luminescence data points on an excitation-emission grid with the exemplary 10 nm bandwidth.

Bispectral fluorescence measuring colorimeters have heretofore been designed and custom-built on a one-of-a-kind basis by large laboratories for their own personal use, and have been large systems filling an entire room, highly expensive, very slow operating (up to 17 hours for a measurement in some cases), and difficult to service.

Among these systems is the spectrofluorimeter of the National Physical Laboratory of the United Kingdom described in a paper entitled "Fluorescent Standards For Surface Colour", published in August, 1995 as NPL Report QU111 and authored by D. C. Williams, and a different spectrofluorimeter described in a paper by Jim Leland and Angelo Arecchi; two of the inventors of the present patent application, entitled "Principles of Bispectral Fluorescence Colorimetry". *Photometric Engineering of Sources and Systems,* Angelo V. Arecchi, Editor, *Proceedings of SPIE* Vol. 3140, 76–87 (1997). Large laboratory fluorescent standard measuring colorimeters have also been constructed for government research use at other government laboratories—at BAM, Berlin, Germany, and at NRC, Ottawa, Canada, J. C. Zwinkels and D. S. Gignac, *"Development of a new reference spectrofluorimeter in Spectrophotometry, Luminescence and Colour: Science and Compliance.* C. Burgess and D. G. Jones, eds. (Elsevier, Amsterdam, 1995); and J. C. Zwinkels, D. S. Gignac, M. Nevins, I. Powell, and A Bewsher, *"Design and testing of a two-monochromator reference spectrofluorimeter for high-accuracy total radiance factor measurements." Applied Optics.* Vol. 36. No. 4,892 (1997).

Other references discussing the problems of spectrofluorimetric measurement include the following:

F. J. J. Clarke, *"Problems of spectrofluorimetric standards for reflection and colorimetric use",* NPL Report MOM 12, *National Physical Laboratory Division of Mechanical and Optical Metrology,* (NPL August 1975).

R. Donaldson, *"Spectrophotometry of fluorescent pigments",* British Journal of Applied Physics, 5.210 (1954).

F. Grum, *"Colorimetry of fluorescent materials",* in *Color Measurement,* F. Grum and C. J. Bartleston, eds., Vol. 2 of *Optical Radiation Measurements* (Academic Press, Inc. New York, 1983).

D. Gundlach and H. Terstiege, *"Problems in Measurement of Fluorescent Materials", Color Research and Applications,* Volume 19, Number 6, (1994).

K. D. Mielenz, *"Photoluminescence Spectrometry",* in *Measurement of Photoluminescence,* K. D. Milenz, ed., Vol. 3 of *Optical Radiation Measurements* (Academic Press, Inc., New York, 198)2.

D. C. Williams, *"Fluorescent Standards for Surface Color",* NPL Report QU 111, *National Physical Laboratory, Division of Quantum Metrology,* (NPL, August 1995).

ASTM *Standards on Color and Appearance Measurement,* 3rd Edition *(ASTM, Philadelphia,* 1991).

CTE Technical Committee TC-1.2 *The Spectroradiometric Measurement of Light Sources,* Publication CIE NO. 73 *(CTE,* Paris, 1984).

CTE Technical Committee TC-1.3, *Colorimetry,* 2nd Edition, Publication CTE No. 15.2 *(CTE,* Vienna, 1986).

The present invention, on the other hand, is concerned with the specific problems attendant upon providing a small, commercial bench-top bispectral fluorescence colorimeter ("BTH" in later-described FIGS. 3 and 4) of low cost, high measurement speed (as of the order of ten minutes or less), and practical serviceability, embodying multiple on-board processors operated under judicious choices between software and firmware, and using modular designs of mechanical, optical and electronic components and circuits that enable such size, cost and serviceability reductions. An early prototype, not however embodying the novel features of the present invention as herein claimed, is described in a preliminary brochure of Labsphere, Inc., the assignee of the present application, entitled "The BPC-450 Bispectral Fluorescence Colorimeter" and printed in December, 1997.

OBJECTS OF INVENTION

A primary object of the invention, accordingly, is to provide a new and improved method of and apparatus for bispectral fluorescent color analysis of materials and the like that shall not be subject to the limitations of large laboratory fluorescent colorimetry systems above described, and that to the contrary, enable, for the first time, the availability of bench-top fluorescent color analysis that is generally affordable and useful commercially, and with high speed of operation suited to commercial needs.

Other and further objects will be explained hereinafter and are more particularly delineated in the appended claims.

SUMMARY

In summary, however, from one of its important viewpoints, the invention embraces a modular bispectral fluorescence colorimeter for measuring the fluorescent color of material samples and interfacing with a computer for presenting data relating to the same, the colorimeter having, in combination within a bench-top housing, an excitation monochromator-light source module for illuminating the sample; an emission monochromator module for receiving the light scattered and emitted from the illuminated sample and including a photodiode array for enabling speed of data collection and for separating such into its spectral components; and signal processing means for generating from said data collection the spectral radiance factor of the material, and presenting, at the option of the user at the computer, a variety of data presentation formats including spectral radiance graphs, tabular reports, data tables and color rating reports.

The modular breakdown of the instrument of the invention includes a preferably Xenon light source, an excitation monochromator, a sample head, an emission monochromator, and control/signal processing, as hereinafter fully described.

Preferred and best mode designs, construction and operation are later detailed.

DRAWINGS

The invention will now be described with reference to the accompanying drawings, FIG. 1 of which, as before described, is an explanatory grid showing reference and fluorescence data points (exemplary 41 reflectance data points and 1148 fluorescence data points) on an excitation-emission grid with the illustrative 10 nm bandwidth;

PREFERRED EMBODIMENT(S) OF INVENTION

Figure 1:
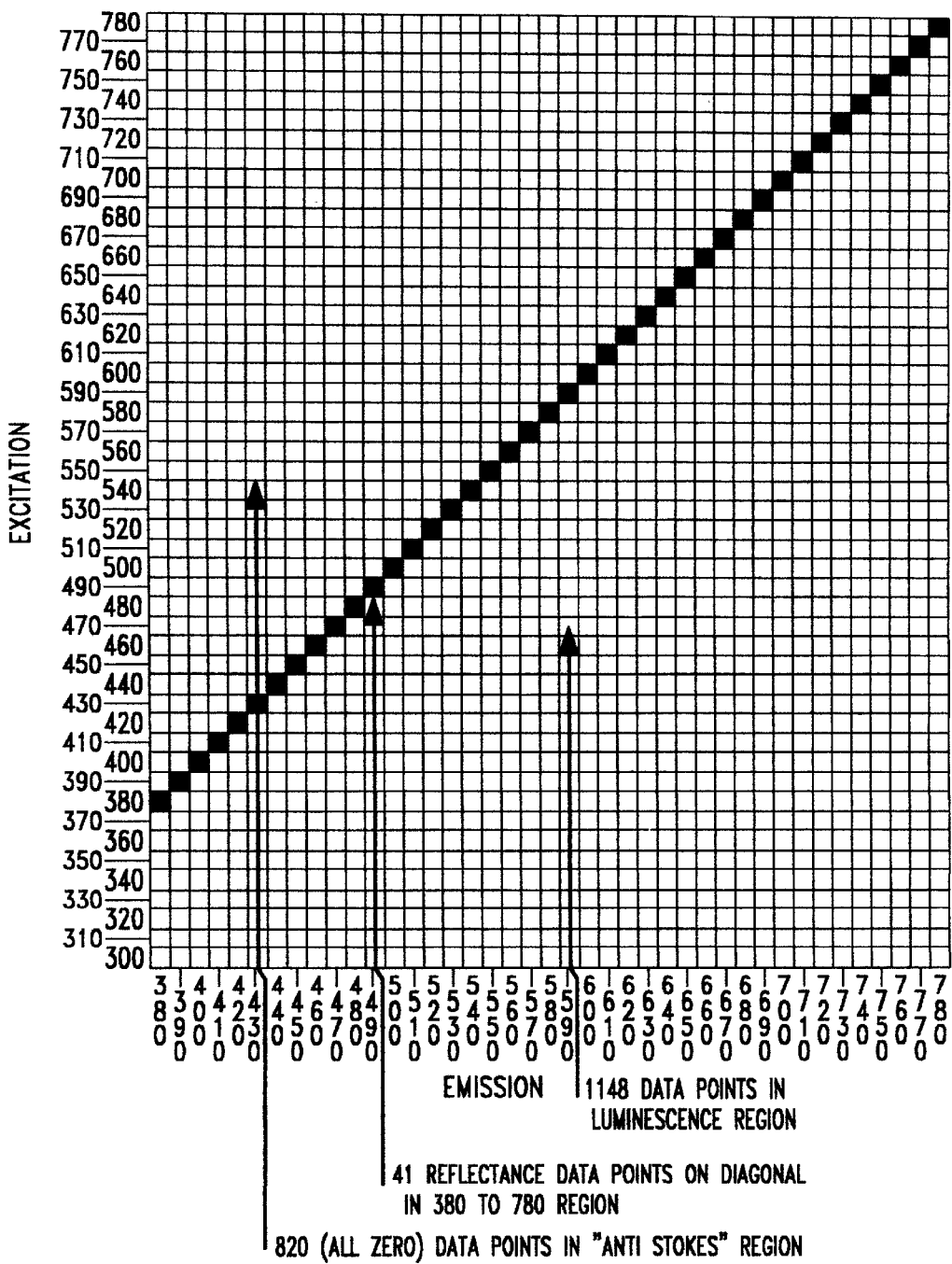

Before describing the preferred techniques and designs that achieve the objectives of the invention, it is believed helpful to review briefly the fundamental optical considerations and then advantages of bispectral measurements for the purposes herein.

The color of a material depends upon the intensity and spectral distribution of the light which leaves its surface. This, in turn, depends upon the type of illumination source under which the material is viewed, and the way the material interacts with that illumination. The color of a material is the combination of the reflectance plus any luminescent component of the material, and the corresponding measurement, is the spectral radiance.

The principal property for most materials is the spectral reflectance throughout the visible portion of the spectrum. Those spectral components that are not absorbed are assumed to be reflected, producing the apparent color.

In the case of fluorescent materials, however, as before mentioned, a portion of the illumination absorbed at certain wavelengths is emitted at different, usually slightly longer visible wavelengths, such that the color of the material cannot always be determined by its spectral reflectance.

Existing instruments, employing a single monochromator to measure the color of a material sample (where the term "material" is herein used generically to embrace any surface), may be classed in two categories instruments using monochromatic illumination, and those using polychromatic illumination. Monochromatic illumination is achieved by placement of a monochromator between the source of illumination and the sample. A single, broadband photodetector is then used to measure the radiation emitted by the sample. A single photodetector, however, cannot differentiate among the various spectral components of this emitted radiation. It therefore cannot provide accurate colorimetric information; nor can it differentiate the reflected and the fluorescent components of the spectral radiance from the material. Alternatively, the monochromator may be placed between the sample and the instrument detection system. Broadband, or polychromatic radiation from the source is then allowed to fall more or less directly upon the material, and the monochromatic detection system is used to analyze the spectral distribution of the radiation emitted by the sample. While the latter method can provide an accurate measurement of the colorimetric properties of a fluorescent material for illumination conditions identical to those provided by the instrument, such a result is illuminant-specific, and cannot be generalized for other common illuminants.

In accordance with the invention, on the other hand, both monochromatic illumination of the material and monochromatic detection of the light emitted from the material (so-called "bispectral measurement") are employed because the measurement is then illuminant independent. For each illuminating wavelength, accordingly, a spectral radiance factor is thereby measured which includes both reflectance and material fluorescence components, resulting in a matrix of bispectral radiance factors.

Figure 2:
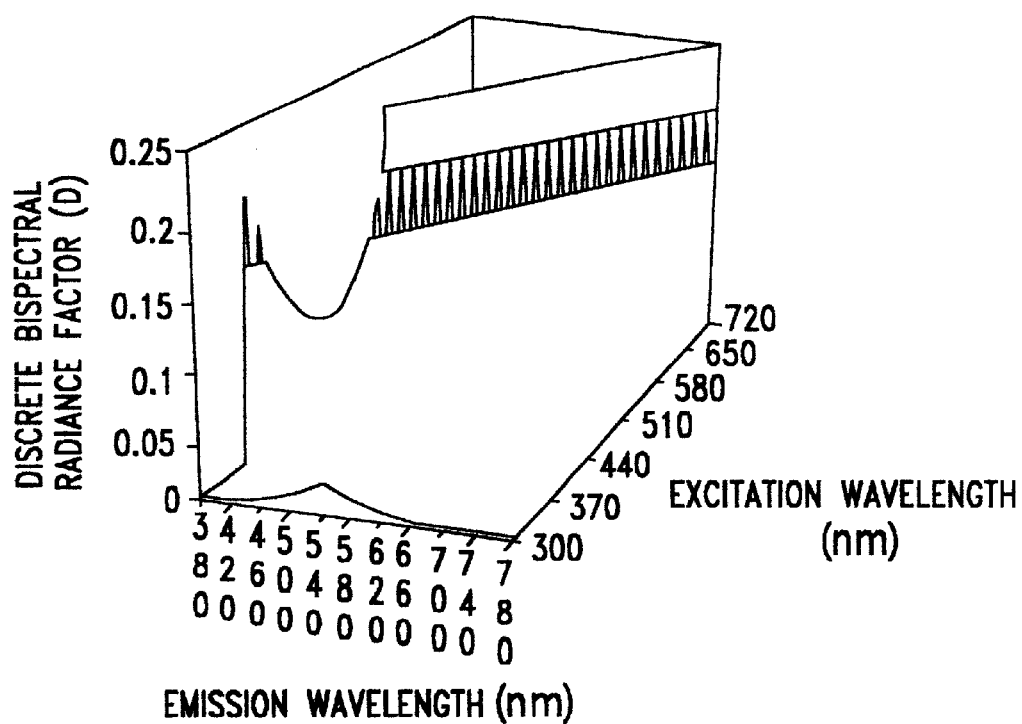
FIG. 2 is an illustrative 3-dimensional (X, Y, Z) bispectral radiance matrix diagram.

Since materials containing fluorescent components need to be characterized in total, and by the wavelengths that excite the fluorescent or luminescent component, this matrix of separated spectral data (called a bispectral radiance matrix) is generically presented as a three-dimensional plot, as in the exemplary FIG. 2, showing the reflectance component on the diagonal and the emitted fluorescence component as a feature in the foreground. In this example, the discrete bispectral radiance factor D is plotted along the Y vertical axis, the excitation or illumination wavelength along the Z axis (300–720 nm), and the emission wavelengths along the X axis (380–780 nm).

The advantage of the bispectral approach to color measurement resides in its allowing the material color to be accurately calculated for any standard illumination condition, with the separated reflected and fluorescent components, permitting the user to see how each contributes to the overall color. In comparison with just monochromatic illumination measurements before-described, measured spectral radiance factors over the 380–780 nm wavelength band for an exemplary fluorescent yellow ink sample material, later referenced, showed that monochromatic illumination overestimates the sample spectral radiance at the shorter wavelengths and underestimates it at the longer wavelengths. As for the previously described polychromatic illumination, only the spectral radiance for the particular instrument illumination source could be measured, and with the before-mentioned sensitivity to changes in illumination. The bispectral measurements, however, achieve proper weighting of the spectral distribution for any standard illuminant and reveal the true spectral radiance factor. Bispectral measurement results, furthermore, may also be compared in terms of the accuracy of the location of the chromaticity coordinates and luminescent factor, as well.

Figure 3:
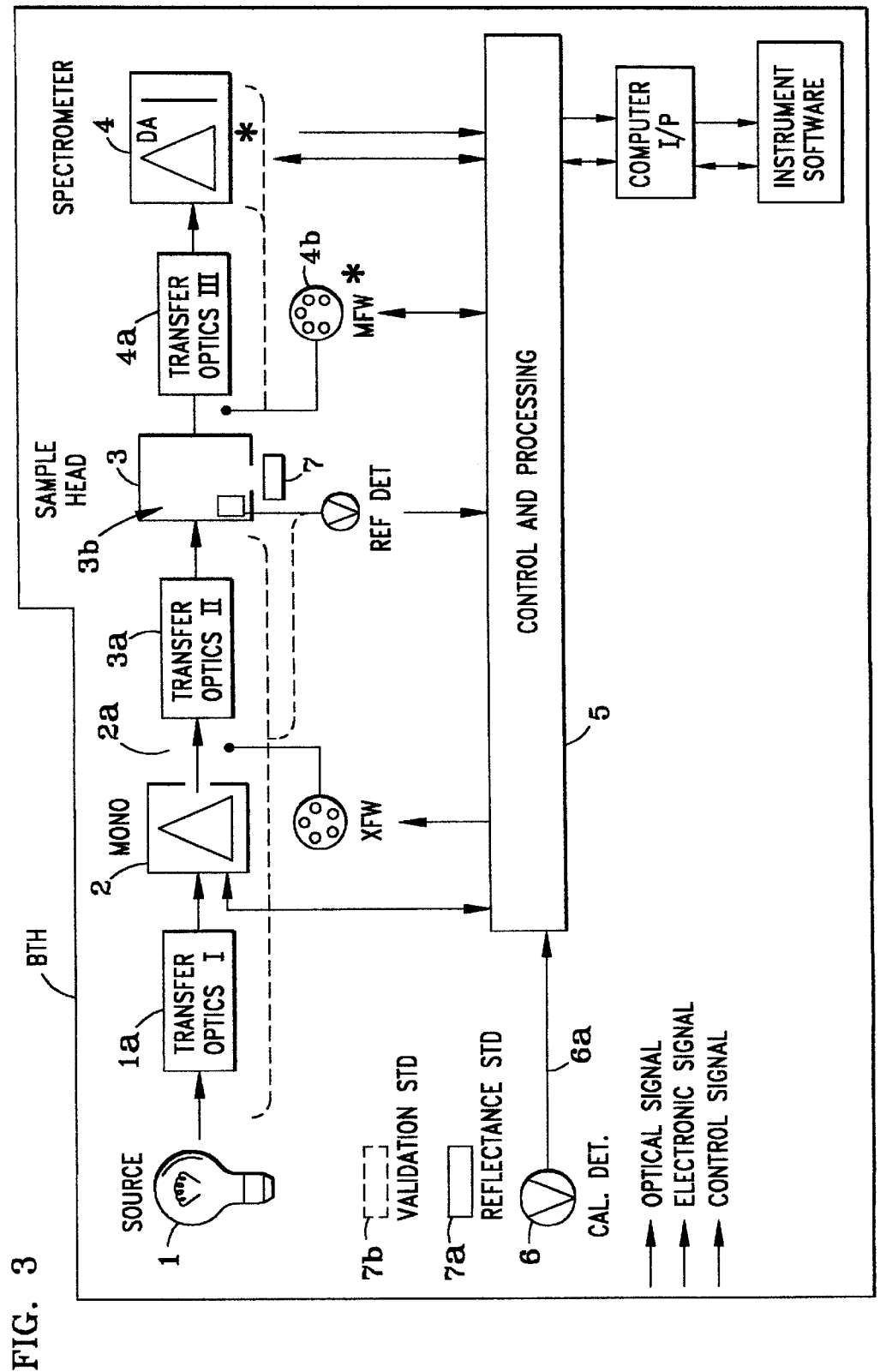
FIG. 3 is a block diagrammatic modular layout of a preferred bench-top instrument embodying the invention.

Turning, now, to the preferred bench-top housing (BTH) bispectral fluorescence colorimeter of the invention as shown in FIG. 3, the apparatus basically comprises:

i) A means of irradiating a material sample with monochromatic radiation, provided in the preferred embodiment as illustrated in FIG. 3, by a source of illumination (1) coupled by means of transfer optics (1a), preferably fiber optics, with an excitation monochromator (2), which in turn is optically coupled by means of additional transfer optics (3a), with a sample head (3), which is equipped with a sample port (7) at which the sample is positioned during measurement.

The transfer optics (1a) between source (1) and excitation monochromator (2) modules are well met by quartz fiber optic bundles. In an alternative earlier embodiment, these requirements have been met in FIG. 4 by a simple system of conventional reflective and refractive optics I'; but the fiber optics of FIG. 3 at I, has distinct performance and constructional advantages thereover. The transfer optics (3a) between excitation monochromator (2) and sample head (3) modules may also be met by a design which incorporates the excitation monochromator exit slit into the body of the sample head module. A plane mirror M may redirect the nearly-collimated beam, as in FIG. 4, which passes this slit to a later-described cone/annulus optics O. In an alternative embodiment, these requirements may well be met by a fiber optic bundle positioned on the axis of the sample head illumination optics, so that the nearly collimated radiation leaving the fiber bundle falls directly on the cone mirror (C in FIG. 4).

ii) A means of detecting radiation emitted by the material sample, and analyzing the spectral distribution of such radiation, provided by a sample head (3), coupled by means of transfer optics at (4a), again preferably fiber optics, FIG. 3, with an emission spectrometer (4). The transfer optics (4a) between sample head and emission spectrometer modules are preferably met again by a quartz fiber optic bundle.

iii) A means of recording and processing data acquired from various detection systems (e.g. 3b, 4, 7a) within the instrument. This is shown provided by a control and processing module (5), which includes a combination of analog and digital electronics, firmware, communication interface to a computer, and instrument software, so-labeled at the lower right in FIG. 3.

iv) A means of controlling the various instrument subsystems in order to automate measurement procedures as hereinafter described. This is illustrated as provided by the control and processing module (5), which includes a combination of analog and digital electronics, firmware, communication interface to the computer, and instrument software, as before stated.

v) A means of calibrating the relative spectral irradiance upon the sample, as a function of excitation wavelength, provided by the combination of a monitor detector (3b) built into the sample head FIG. 3, and an externally-calibrated standard detector (6) which is electronically integrated into the instrument, and which may be positioned at the sample port (7) during such calibration. (Related calibration procedure are later described).

vi) A means of calibrating the relative spectral responsivity of the emission detection system of the instrument to sample radiance, as a function of emission wavelength, shown provided by an externally-calibrated reflectance standard (7a), which may be positioned at the sample port (7) in order to perform a measurement that enables the transfer of the relative spectral calibration of the instrument excitation system (described above) to its emission detection system.

vii) A means of calibrating the instrument absolute photometric scale by balancing the effective response of the excitation and detection systems. This is provided in the preferred embodiment by the externally-calibrated reflectance standard (7a) described above, FIG. 3.

Proceeding, now, to explicit details of the preferred implementation of the above-described modules, the source of illumination (1) must provide significant energy over the entire excitation spectral range of the instrument. For colorimetric purposes, it is necessary to illuminate the sample at a range of wavelengths representing the entire visible spectrum. Since, moreover, invisible ultraviolet radiation may excite fluorescent materials to emit radiation at visible wavelengths, a bispectral fluorescence colorimeter must also be capable of measuring samples at excitation wavelengths extending beyond the visible, into such ultraviolet range. In the preferred embodiment, the instrument excitation spectral range is 300–780 nm. The required energy is here preferably provided by a continuous-wave type Xenon lamp, with associated power supply.

The sample head (3) may also incorporate means to monitor indirectly the irradiance upon the sample surface during "sample scanning", as later described. This is desirable in cases where the source or illumination optics (1a, 2, 2a, 3a) may be unstable. In the preferred embodiment, a fraction of the radiation entering the sample head is redirected by means of a beam splitter (not shown) to the before-mentioned monitor detector (3b).

The emission spectrometer (4), furthermore, must separate the radiation collected from the sample into its spectral components, detecting the energy collected in each spectral band. The spectrometer spectral range must also extend over the entire visible region, and its spectral resolution must comply with standard colorimetric requirements stated in ASTM E-308. In the preferred embodiment, the emission spectrometer (4) is a 512-element diode-array (DA, FIGS. 3 and 4) spectrograph, with a spectral range of 380–780 nm, and a slit bandwidth of approximately 4.4 mm. By combining spectrograph array readings into 10 nm bins, and effective bandpass function is obtained which is approximately trapezoidal in shape, with a half-height bandwidth of 10 nm.

If it is desired that the emission spectrometer (4) employs a grating-type dispersive element, the instrument must include means to filter radiation from the sample, in order to avoid illuminating the spectrometer detection element(s) with multiple orders from the spectrometer grating. In the preferred embodiment, such order-sorting is accomplished by means of filters placed at various locations in the optical path between the sample and the spectrograph, including, in particular, a filter-wheel $FW_2$, FIG. 4, positioned near the entrance aperture of the optical fiber bundle (4a), which deploys different spectral "cut-on" filters, depending on the current excitation wavelength. At certain excitation wavelengths, it is necessary to perform two emission readings at each excitation wavelength, with two different filters deployed by the emission filter wheel. Data from such "double-scanning" DS is later combined to provide a single virtual spectrometer reading. In an alternative embodiment, a mosaic filter may be incorporated into a diode-array spectrograph in such a way as to provide the requisite order sorting without the need for an emission filter-wheel, or for "double-scanning". Spectrometers suitable for use with an emission filter-wheel include the diode-array spectrograph, manufactured by Labsphere, the assignee of the present invention. Spectrometers suitable for use without an emission filter wheel include the spectrograph manufactured by Zeiss.

The before-mentioned excitation monochromator (2) must separate the radiation from the source into its spectral components, so that in any give monochromator position, the sample is illuminated by nearly monochromatic radiation centered at a given wavelength. The range of such excitation wavelengths, as above-described, extends over the entire visible spectrum, and into the ultraviolet range. The excitation monochromator must also include means to suppress higher-order reflections from the monochromator grating, in order to avoid illuminating the sample with radiation falling outside the nominal excitation band. In the preferred embodiment, such order-sorting is accomplished by means of filters placed at various locations in the optical path between the source and the sample head, including a filter-wheel, $FW_1$ FIG. 4, positioned near the monochromator exit slit, which deploys different spectral "cut-on" filters, depending on the current excitation wavelength. This filter wheel $FW_1$ is also used to block radiation from reaching the sample, enabling a photometric zero reading to be taken before every emission spectrometer and monitor detector reading, if necessary.

Figure 4:
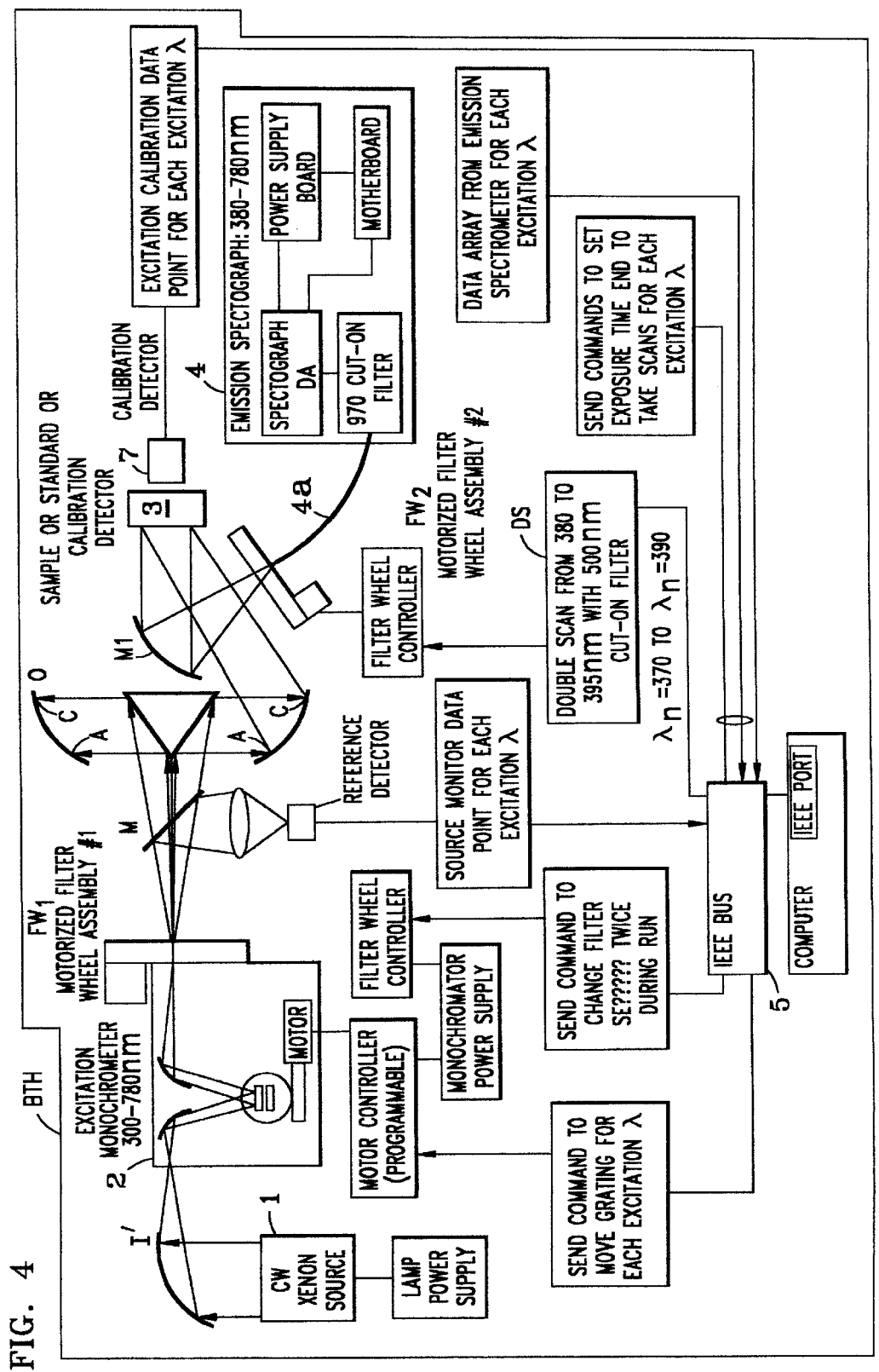
FIG. 4, is a similar diagram with modifications.

The sample head (3) transfers radiation from the excitation monochromator sample, and from the sample to the emission spectrometer, in compliance with specific geometric conditions. In the preferred embodiments shown, the specified illumination is an annular 45°/0° geometry O, as illustrated in FIG. 4, and which is also to be used in the embodiment of FIG. 3. The annular 45° illumination geometry is realized here by the combination of the before-mentioned conical mirror C and an annular mirror A or elliptical cross-section. Radiation entering the sample head is nearly collimated, and is reflected first by the conical mirror C, and then by the annulus, toward the sample surface in such a way that the mean angle of incidence is 45°, with irradiance approximately uniform as a function of azimuth angle. The normal (0°) collection geometry is realized here by an off-axis paraboloid mirror, M' which collects radiation leaving the sample surface at near 0°, and directs it to the aperture of the fiber-optic bundle (4a) leading to the instrument emission spectrometer (4). Alternate geometries may also be used, including hemispherical illumination and/or collection, but the above-specified geometry is deemed preferable.

Turning, now, to the before-mentioned control and processing module (5), this module must operate in a "sample scan" mode, in which the instrument automatically performs a bispectral scan, wherein the excitation monochromator is fixed at a series of excitation wavelength positions, and readings from the emission spectrometer and monitor detector are recorded for each such position. Calibration-related corrections, and other calculations, are automatically performed in order to provide a bispectral matrix of quantitative "discrete bispectral radiance factor" data. The control and processing module (5) may also operate in other modes, in order to provide abridged sample data, or to automatically perform various calibration and diagnostic procedures.

It is now appropriate to address the before-mentioned calibration procedures. The control and processing module (5) may operate in a "calibration" mode in which the instrument automatically executes procedures providing data for the purpose of excitation calibration, emission calibration, and absolute photometric calibration, as mentioned above. Such calibration may be accomplished by means of any one of four fundamental types of calibration procedure, as summarized in the following Table 1. In the preferred embodiment, the approach here designated as approach #3 has been selected. The calibration procedure associated with this approach involves performing a bispectral "reflectance calibration scan" of a white, non-luminescent standard calibrated for spectral reflectance factor (i.e. spectral radiance factor), and a mono-spectral "excitation calibration scan" involving the use of a calibrated detector positioned at the instrument sample port (7).

TABLE 1

Summary, Four Approaches to Bispectrometer Calibration:

| # | Physical Standards Required | Type of Calibration | Values |
|---|---|---|---|
| 1) | (Set of) Luminescent Material(s) | Donaldson radiance factor | $D_0(\mu,\lambda)$ |
| 2) | Non-Luminescent White Diffuser | Spectral Reflectance Factor | $R_d(\lambda)$ |
|  | Source (at Sample Position) | Relative Spectral Radiance | $\phi_c(\lambda)$ |
| 3) | Non-Luminescent White Diffuser | Spectral Reflectance Factor | $R_d(\lambda)$ |
|  | Reference Detector (at Sample Position) | Relative Spectral Responsivity | $K_c(\lambda)$ |
| 4) | Non-Luminescent White Diffuser | Spectral Reflectance Factor; at single point | $R_d(\lambda_o)$ |
|  | Reference Detector (at Sample Position) | Relative Spectral Responsivity | $K_c(\lambda)$ |
|  | Source (at Sample Position) | Relative Spectral Radiance | $\phi_o(\lambda)$ |

This reflectance calibration scan consists of a bispectral scan performed with a calibrated reflectance standard (7a) positioned at the sample port (7), by means of the same procedure as that described for the previously mentioned "sample scan". [The data matrix acquired during the reflectance calibration scan is denoted as $S_d$].

During the excitation calibration scan, the instrument automatically fixes the excitation monochromator (2) at a series of excitation wavelength positions, and reading from both the external, calibration detector and the internal, monitor detector are recorded for each position. [The data array acquired during the excitation calibration scan is denoted at $S_2$].

Calculations performed by the control and processing module (5) in order to obtain colorimetric values for the sample under test may be divided into three stages: 1) Pre-processing, in which readings from each of the instrument detection elements are integrated into a data array described as "raw sample data" ($S_1$); 2) Data Correction, in which correction factors derived from the calibration procedures described above are applied to the raw sample data to obtain an array of discrete bispectral radiance factor data (D); 3) Data Reduction, in which discrete bispectral radiance factor data are reduced to illuminate-specific spectral radiance factor data ($\beta$) and/or illuminant-and observer-specific colorimetric data. Preprocessing calculations include dark-current subtraction, spectral "binning" of spectrograph data, and merging of "double-scans", as well as the normalization of spectrograph readings by monitor-detector readings, as is known.

Figure 5:
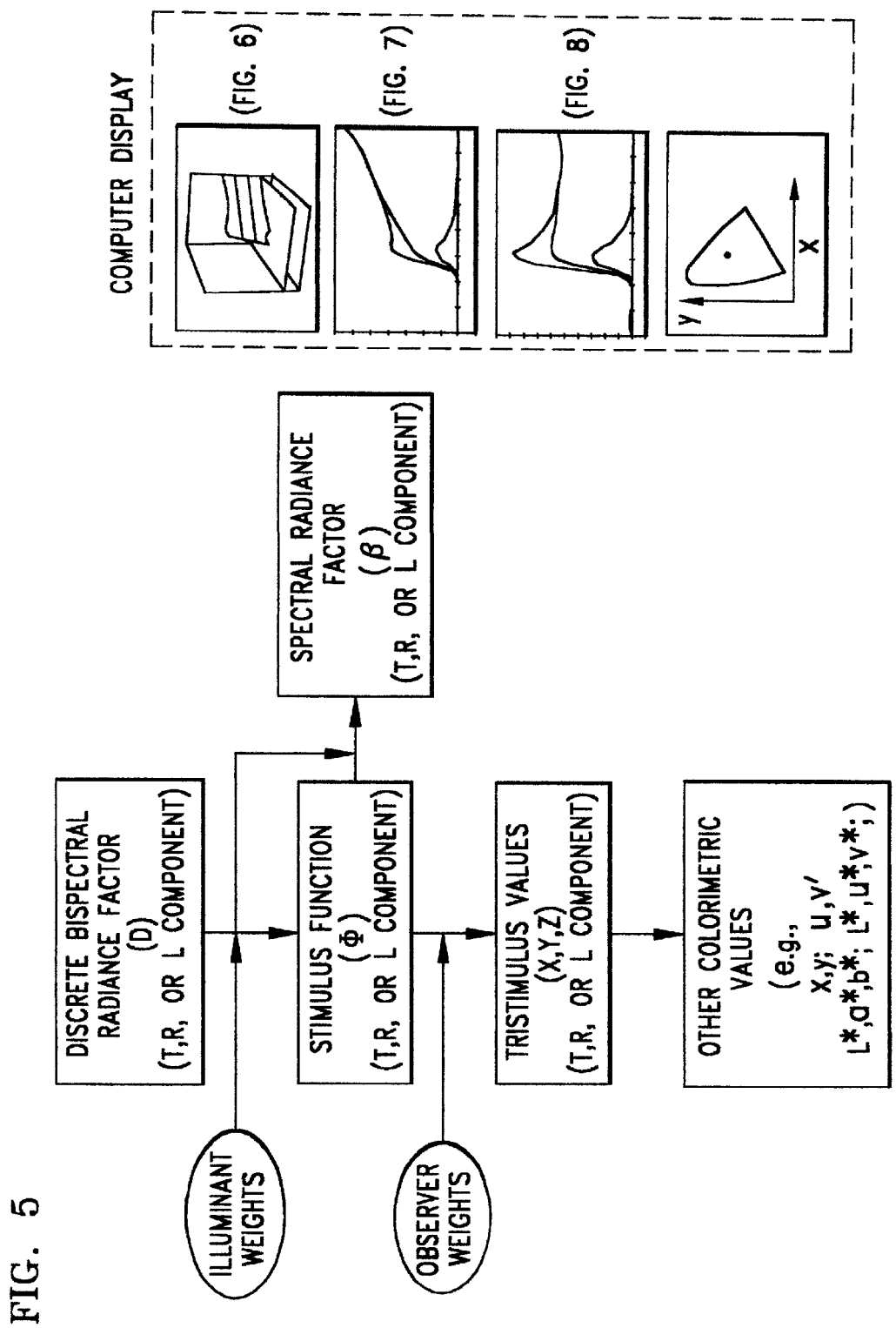
FIG. 5 is a flow chart illustrating the reduction of bispectral data measurements to spectral and colorimetric values.
Figure 6:
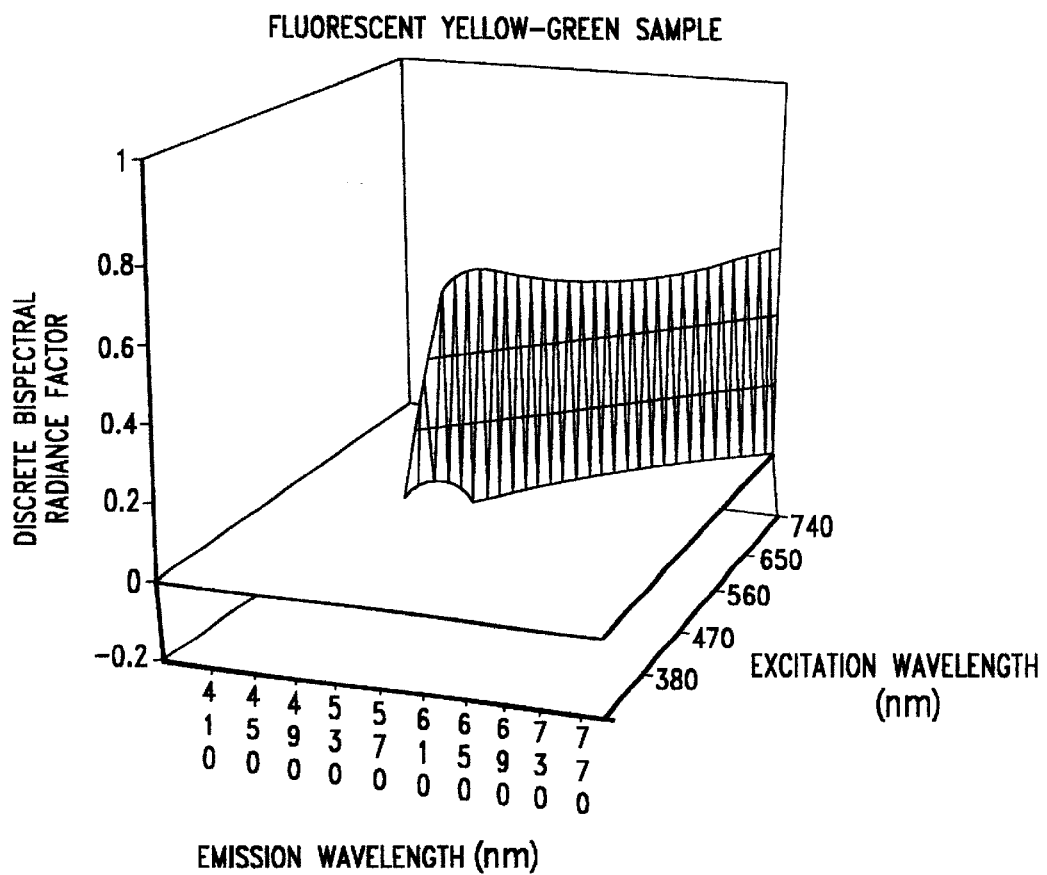
FIGS. 6, 7 and 8 are resulting data display presentations.
Figure 7:
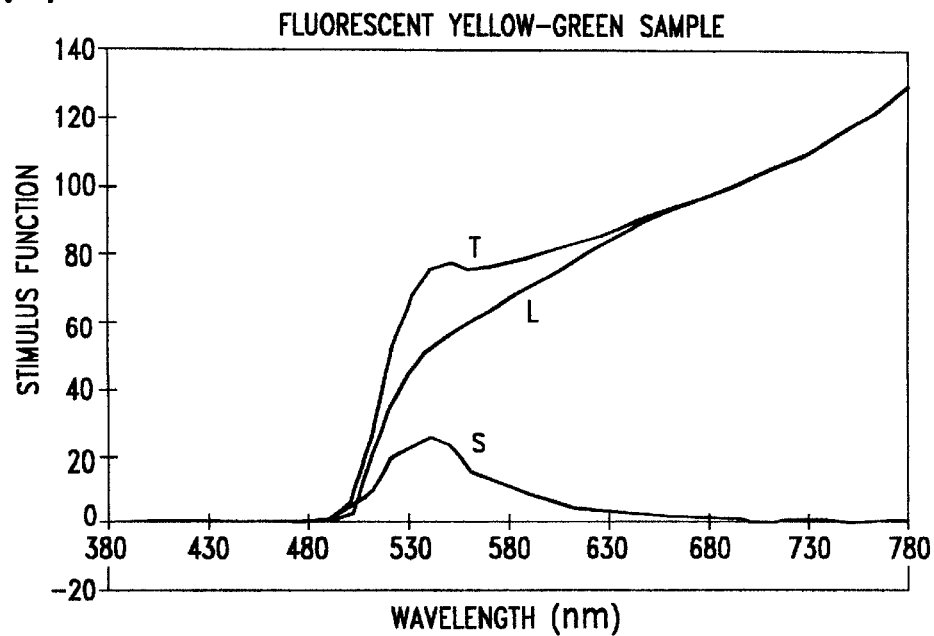
Figure 8:
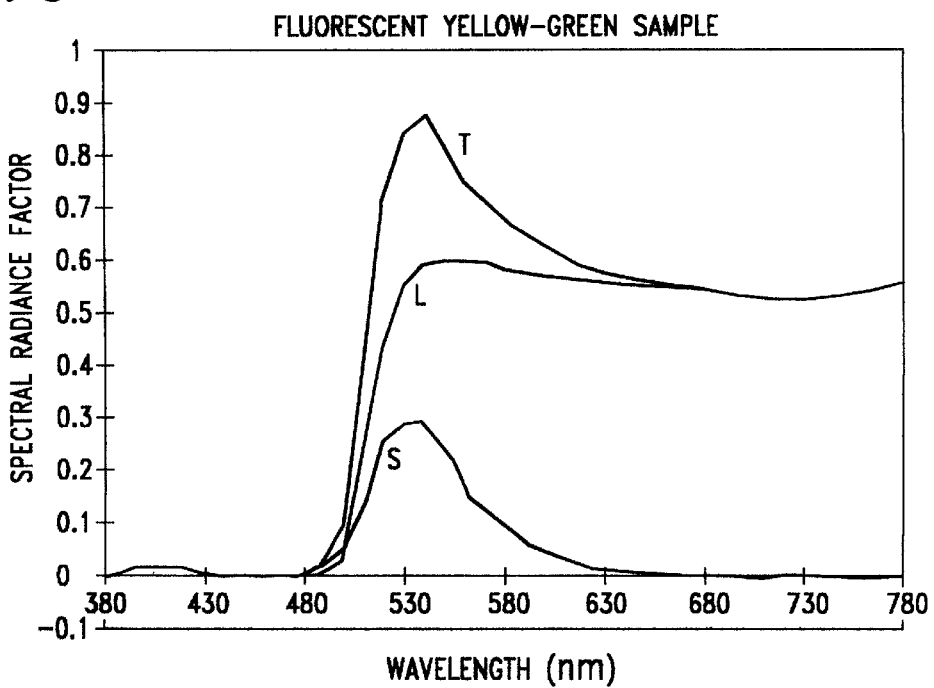

The general flow of Data Reduction calculations, and the relationship between bispectral data, spectral radiance factor data, and colorimetric data are illustrated in FIG. 5. As there shown, the reduction of the measured bispectral data to spectral and colorimetric values is effected with the contributions of the measured discrete bispectral radiance factor (D), with its T, R or L components, weighted by illuminant weights; the stimulus function ($\phi$), weighted by observer weights and from which the spectral radiance factor ($\beta$) is obtained; the tristimulus values (X, Y, Z); and other colorimetric values. This enables the user at the computer, respectively to obtain, as desired, a ready display of the discrete bispectral radiance factor graph of FIG. 6 (shown also in the display at the top right of FIG. 5); a graphic (or tabular data if preferred in all instances, not shown) display of the stimulus function, FIG. 7—illustrated herein for the case of an actual fluorescent yellow-green sample (shown, also in the display at the right in FIG. 5), a spectral radiance factor graph, FIG. 8 (shown also in FIG. 5); and a colorimetric color rating chart, bottom of FIG. 5, among other display presentations.

Through the above-described software control, the measurement routine may be initiated with a single button click initiating the measurement routine. As before stated, in less than about ten minutes, complete and accurate characterization of the sample is achieved. Data may be presented, in accordance with the system of the invention, in a variety of formats including the above-discussed spectral radiance graphs, tabular reports, data tables and color rating reports. The data, moreover, may be saved in text format for simplified transfer to other application software analysis, if desired, such as spreadsheets, databases, scientific and word processing programs.

The control software, FIG. 3, which has successfully been implemented as a Windows® based interface, allows the user to specify the illuminant and standard observed for calculating chromaticity numbers. Also, the user is allowed to view the complete bispectral matrix numerically, and to export it for graphical viewing. A monospectral reduction of the bispectral data, possibly more comprehensible for people accustomed to viewing data on non-fluorescent samples, is also available numerically and graphically in the software. The software also automatically separates the chromaticity numbers into reflective and fluorescent components.

Further modifications will occur to those skilled in this art, and such are considered to fall within the spirit and scope of the invention as defined in the appended claims.

What is claimed is:

1. A modular bispectral fluorescence colorimeter for measuring the fluorescent color of a material sample and interfacing with an external computer for presenting data relating to the sample, the colorimeter having, all within a bench-top housing, an excitation monochromator-light source module for illuminating the sample; an emission monochromator module for receiving the light scattered and emitted from the illuminated sample through a filter wheel deploying different spectral cut-on filters depending on the wavelength of the illuminating light source, and the emission monochromator further including a photodiode array spectrograph for enabling speed of data collection and embodying further cut-on filter means for separating desired spectral components; a fiber optic path connected between the filter wheel and the further cut-on filter means of the emission monochromator photo diode array spectrograph; and signal processing means for generating from said data collection the spectral radiance factor of the sample, and presenting at the external computer, a variety of data presentation formats including fluorescent color spectral radiance graphs, tabular reports, data tables and color rating reports.

2. The bispectral fluorescence colorimeter of claim 1 wherein the illumination from the excitation monochromator is directed in an annular ring upon the sample and at an angle of 45° thereto.

3. The bispectral fluorescence colorimeter of claim 2 wherein optical means collects the light scattered normally from the sample for impingement on to the emission monochromator.

4. The bispectral fluorescence colorimeter of claim 1 wherein the excitation monochromator is of the scanning type provided with an input slit to which a fiber optic light guide is connected and extends to an optic head that produces an annular 45 degree/0 degree geometry positioned to illuminate the sample.

5. The bispectral fluorescence colorimeter of claim 4 wherein said normally scattered light is directed by a mirror positioned off-axis of said optic head to the filter wheel and via said fiber optic path and said further cut-on filter means for receipt by said photodiode array of the emission monochromator spectrograph.

6. The bispectral fluorescence colorimeter of claim 1 wherein a calibration means is provided for performing each of a bispectral reflectance calibration scan of a white, non-luminescent standard, and a mono-spectral excitation calibration scan.

7. The bispectral fluorescence colorimeter of claim 6 wherein the excitation calibration scan is effected by means for automatically fixing the excitation monochromator at a series of excitation wavelengths, and with means for recording both external calibration detection and internal monitor detection for each wavelength.

8. A method of measuring the color of a fluorescent material sample by bispectral fluorescence colorimetry, that comprises, within a closed housing illuminating the sample with a ring of monochromatic light from an excitation monochromator directed at an angle of 45° to the sample; collecting the light scattered and emitted from the illuminated sample at a region normal to the sample; receiving the collected scattered and emitted light upon a photodiode array in an emission monochromator, and processing the output of the emission monochromator to provide spectral radiance factors defining the color of the sample.

9. The method of claim 8 wherein the illumination provided by the excitation monochromator and the scattered and emitted light provided to the emission monochromator diode array are propagated by fiber optic light guide paths.

10. The method of claim 8 wherein the processing for obtaining colorimetric values for the sample under test includes raw sample data pre-processing, correcting the raw sample data with calibration to obtain an array of discrete bispectral radiance factor data, and reducing the bispectral radiance factor data to illuminant specific spectral radiance factor data and/or illuminant and observer specific colorimeter data.

* * * * *